United States Patent

Henneken et al.

(10) Patent No.: US 6,571,164 B1
(45) Date of Patent: May 27, 2003

(54) METHOD FOR CONTROLLING AN AUTOMATIC GEARBOX INVOLVING DETERMINATION OF A TRANSVERSE ACCELERATION VALUE

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/936,010

(22) PCT Filed: Mar. 8, 2000

(86) PCT No.: PCT/EP00/01985

§ 371 (c)(1),
(2), (4) Date: Sep. 6, 2001

(87) PCT Pub. No.: WO00/55526

PCT Pub. Date: Sep. 21, 2000

(30) Foreign Application Priority Data

Mar. 13, 1999 (DE) .......................................... 199 11 301

(51) Int. Cl.[7] ................................................ G06F 7/76
(52) U.S. Cl. ............................. 701/87; 701/70; 701/75; 701/79; 303/121; 303/138; 180/197
(58) Field of Search ............................. 701/51, 53, 55, 701/72, 79, 87, 74, 75, 70; 180/197, 233; 303/140, 121, 138, 143, 146, 139, 147; 702/33; 477/34, 46, 43

(56) References Cited

U.S. PATENT DOCUMENTS

| | | | |
|---|---|---|---|
| 4,844,557 A | | 7/1989 | Giers .......................... 303/140 |
| 5,172,318 A | | 12/1992 | Meissner et al. ............. 701/72 |
| 5,243,526 A | * | 9/1993 | Ito et al. ...................... 180/177 |
| 5,429,428 A | * | 7/1995 | Yasuda ........................ 180/197 |
| 5,474,507 A | * | 12/1995 | Streib et al. ................. 477/129 |
| 5,732,380 A | * | 3/1998 | Iwata .......................... 123/336 |
| 5,748,472 A | * | 5/1998 | Gruhle et al. ................. 477/43 |
| 6,151,546 A | * | 11/2000 | Schmitt et al. ............. 180/197 |

FOREIGN PATENT DOCUMENTS

| | | | |
|---|---|---|---|
| DE | 39 22 040 A1 | 1/1991 | ........... F16H/61/16 |
| DE | 196 18 804 A1 | 11/1997 | ........... F16H/59/58 |
| DE | 196 18 805 A1 | 11/1997 | ........... F16H/59/58 |
| EP | 0 293 561 A2 | 12/1988 | ............. B60T/8/60 |
| EP | 0 694 138 B1 | 6/1997 | ........... F16H/61/02 |

* cited by examiner

Primary Examiner—Jacques H. Louis-Jacques
(74) Attorney, Agent, or Firm—Davis & Bujold, P.L.L.C.

(57) ABSTRACT

The invention relates to a method for control of an automatic transmission of a motor vehicle wherein an electronic transmission control, by means of signals proportional to wheel speeds (NRA3, NRA4), determines a transverse acceleration value (AQ) for outputting to additional program modules. The determined wheel speeds (NRA3, NRA4) which enter in the transversal acceleration value (AQ) are corrected by vehicle wheels in a tolerance balance module of the wheels (M1) when a dynamic tire radius (RDYN) in one of the vehicle wheels diverges from a tire radius given in an optimum tire geometry.

20 Claims, 2 Drawing Sheets

METHOD FOR CONTROLLING AN AUTOMATIC GEARBOX INVOLVING DETERMINATION OF A TRANSVERSE ACCELERATION VALUE

The invention relates to a method for control of an automatic transmission of a motor vehicle wherein an electronic transmission control, by means of signals proportional to wheel rotational speeds, determines a transverse acceleration value for outputting to additional program modules.

Modern automatic transmission in motor vehicles are controlled by an electronic transmission control (EGS) which for automatic selection of a stored shifting program which, as known from the publication "ATZ Automobiltechnische Zeitschrift" 94 (1992), describes a driver type recognition, an environment recognition, a driving situation recognition, or the recognition of a manual engagement and for gear selection in accordance with situations communicates with other control units and computers of different aggregates.

An important variable for control of the automatic transmission adapted to the current operating situation is constituted by the transverse acceleration value which is calculated in the electronic transmission control.

In "ATZ Automobiltechnische Zeitschrift" 94 (1992), pages 34 ff, is described a curve recognition whereby starting from a defined transverse acceleration, upshifts are prevented and starting from another higher transverse acceleration, downshifts are also prevented.

In order to be able to recognize the curve without an expensive acceleration sensor, the actual transverse acceleration value is calculated via an algorithm. The transverse acceleration is assessed by determining the speed differences between the non-driven curve inner and outer wheel taking into account the traveling speed.

However, identical rolling scopes of the wheels are a condition for applying the method. Said condition is constantly watched in the already known method, the curve recognition being deactivated when it is detected that the wheels have different rolling scopes.

Since the tire diameters of the wheels and thus the wheel speeds often differ from each other in the practice due to air filling of different power or on account of different profile abrasions, the calculated transverse acceleration value does not correspond to the reality, the consequence of which can be a mistaken gear selection.

Other known methods involving calculation of the transverse acceleration value are, for ex., the recognition of cornering according to DE 39 22 040 or the evaluation of a cornering according to DE 196 18 805 A1.

EP 0 694 138 B1, DE 196 18 804 A1 and DE 196 18 805 A1 have disclosed other methods for control of the automatic transmission using the transverse acceleration in which methods the tire diameters always play a decisive part in the calculation of the transverse acceleration.

In cases of different tire diameters and consequently different wheel speeds, these methods are all subject to error. In critical driving situations this can result not only in reducing the driving comfort but also in a dangerous situation.

The problem on which the invention is based is to make available a method for control of an automatic transmission of a motor vehicle in which an electronic transmission control determines by means of signals proportional to wheel speeds a transverse acceleration value for outputting to additional program modules, the transverse acceleration value being sufficiently precise even in case of different geometries and speeds of the individual wheels.

According to the invention this problem is solved by a method according to claim 1.

The inventive method offers the advantage that the transverse acceleration value required for numerous modules of the electronic transmission control can be calculated with more accuracy and yet in a simple manner via the wheel speeds.

With the inventive method are corrected divergences fro the optimum tire geometry which result, for ex., from different tire pressure, different tire profile, or different tire types so that an adulteration of the transverse acceleration value in the calculation of which wheel speeds enter are prevented.

A more precise transverse acceleration value resulting from the inventive tolerance balance of the wheels by which the wheel speed tolerance is detected and compensated prevents in turn an adulterated evaluation of the traveling situation and contributes to a precise tuning of the transmission with a shifting strategy that does justice to the situation and is adapted to the environment and to the type of driver.

In an advantageous arrangement of the inventive method it can be provided that from the wheel speeds a standardized wheel speed difference NNDO be determined which after correction by the value of a long-time filtered standardized wheel speed difference NNDF is processed as corrected standardized wheel speed difference NND in a function for calculation of the transverse acceleration value.

A great precision of the inventive method is particularly achieved when the standardized wheel speed difference NNDO is formed from a quotient of a wheel speed difference divided by the median wheel speed based on the non-driven vehicle wheels and the long-time filtered standardized wheel speed difference NNDF by means of filtering the standardized wheel speed difference NNDO over a predefined time, preferably with a low pass of the first order.

Other advantageous embodiments and applications of the invention result from the sub-claims and from the embodiment described herebelow in principle with reference to the drawing wherein:

Figure 1:
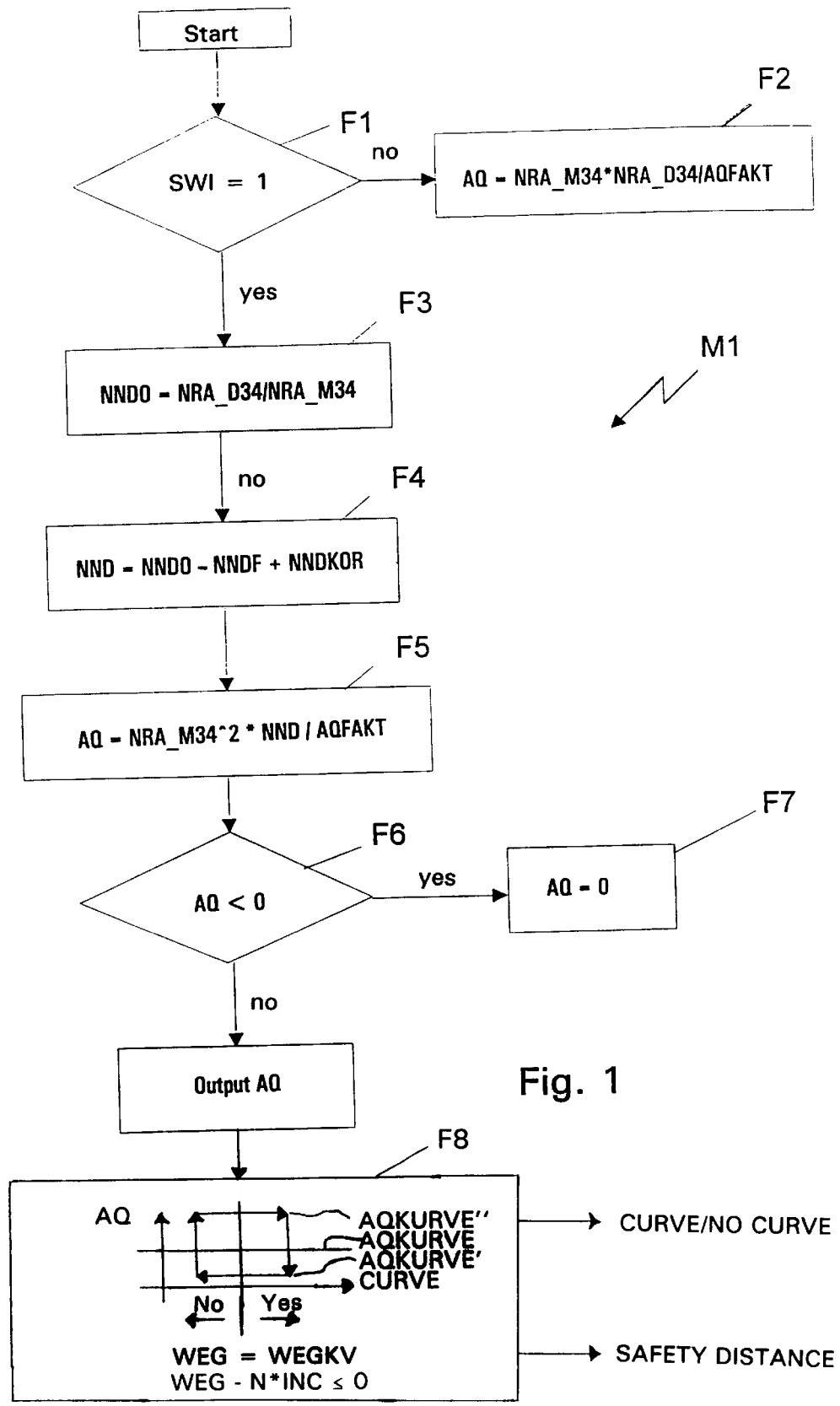
FIG. 1 is a diagrammatic representation of a method sequence for determining a transverse acceleration value in a control of an automatic transmission of a motor vehicle.

Referring to FIG. 1, it extensively diagrammatically shows a method sequence in a program module M1 of a method for control of an automatic transmission of a motor vehicle in which an electronic transmission control, by means of signals proportional to the wheel speed NRA3, NRA4, determines a transverse acceleration value AQ which is outputted to additional program modules.

In the program module M1, which is a wheels tolerance balance module, to determine the transverse acceleration value AQ, the measured wheel speeds NRA3, NRA4 of the vehicle wheels that enter in the calculation are corrected via a long-time adaptation in a manner such as to compensate different dynamic tire radii RDYN which diverge from an optimum tire geometry.

As dynamic tire radius RDYN is here examined the tire radius for a slip-free rolling wheel during travel taking into account the load of the vehicle and the temperature.

Figure 2:
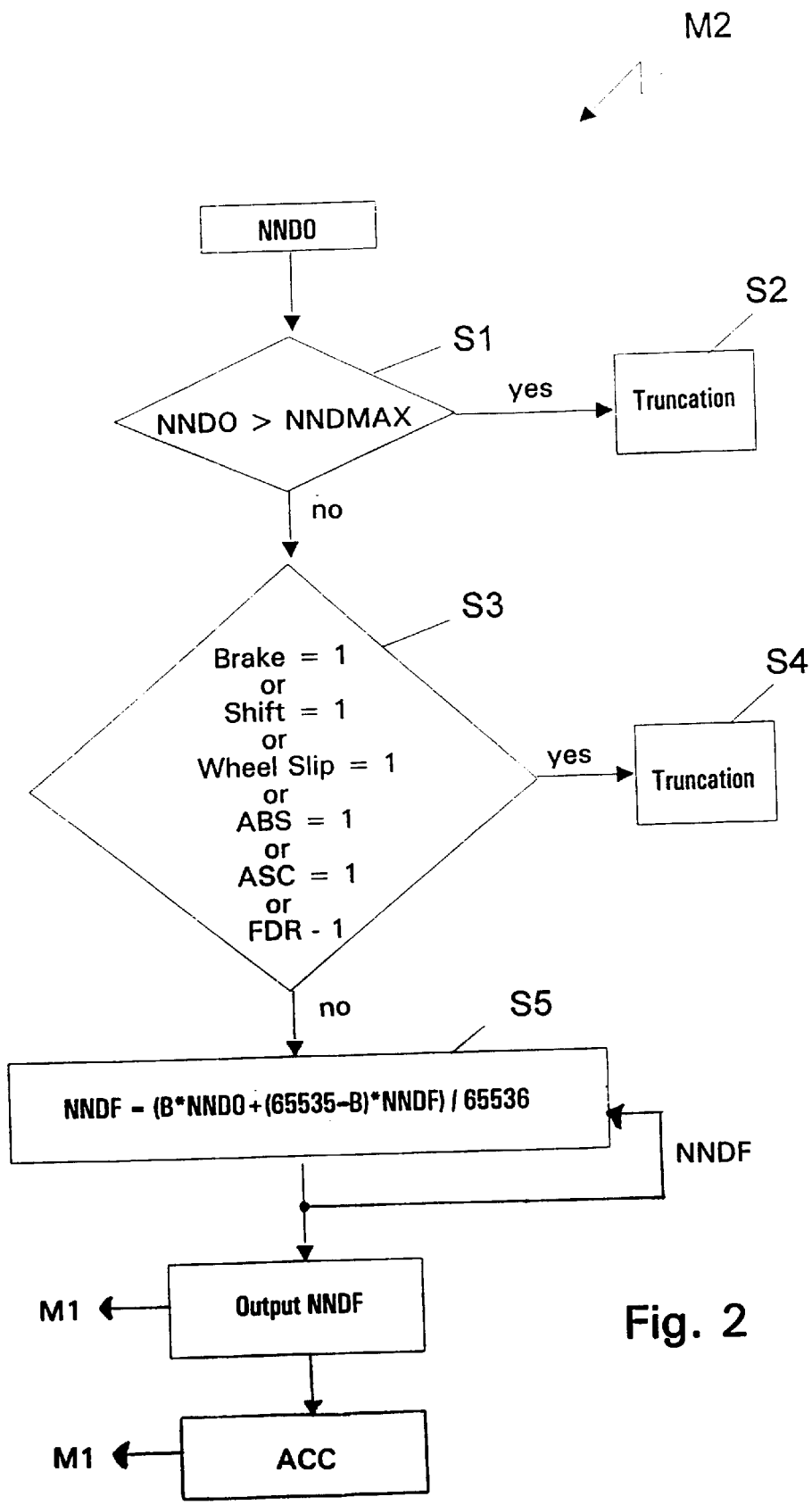
FIG. 2 is a diagrammatic representation of a method sequence for determining a long-time filtered standardized wheel speed difference which enters in the method according to FIG. 1.

For calculating the transverse acceleration value AQ, from the wheel speeds NRA3, NRA4 a standardized wheel speed difference NNDO is determined which is long-time filtered in a method shown in FIG. 2. By subtracting the long-time filtered standardized wheel speed difference NNDF from the actual standardized wheel speed difference NNDO, there is obtained a corrected standardized wheel speed difference NND which is processed in a function F5 for calculating the transverse acceleration value AQ.

The wheel speeds NRA3, NRA4 are thus fundamental for the calculation, the wheel speed NRA3 being associated here with a left rear wheel and the wheel speed NRA4 with a right rear wheel. The wheel speeds NRA3 and NRA4 used for the calculation are the wheel speeds of the non-driven wheels, since these ensure a great precision considering a possible drive slip in driven wheels.

From the measured wheel speeds NRA3, NRA4 is first formed a median wheel speed NRA_M34 according to the following function:

$$NRA\_M34 = (NRA3 + NRA4)/2$$

The tolerance balance of the wheels is carried out only in a certain a specific velocity range, since wheel speed sensors deliver accurate signals only in a specific velocity range or wheel speed range. In case the median wheel speed NRA_M34 falls below a lower threshold value NRAMIN or exceeds an upper threshold value NRAMAX, the transverse acceleration value AQ is set always at zero independently of whether the tolerance balance of the wheels is activated or not.

Besides, from the wheel speeds a wheel speed difference NRA_D34 is calculated according to the following function:

$$NRA\_D34 = |NRA3 - NRA4|$$

As can be seen in FIG. 2, at the start of the tolerance balance module of the wheels M1, it is tested as starting criterion in a differentiation function F1 whether an application switch SWI is activated for the tolerance balance of the wheels.

When the electronic transmission control detects a variable setting "SWI=0" and thus a deactivation of the tolerance balance of the wheels, the transverse acceleration value AQ is calculated in a processing function F2 according to the following function:

$$AQ\{m/s^2\} = (NRA\_M34 * NRA\_D34)/AQFAKT$$

The variable AQFAKT stands here for a factor for calculation of the transverse acceleration in a curve which is determined according to the following function $$AQFAKT = SB\{m\} * 3600/(4 * Pi^2 * RDYN^2\{m^2\})$$

with a track width SB which reproduces the distance between the left and right wheels and "RDYN" as dynamic tire radius.

When in the differentiation function F1 a condition "SWI=1" is detected, that is, that the software switch SWI has been connected for tolerance balance of the wheels, in a subsequent function F3 the standardized wheel speed difference NNDO is calculated. This results regardless of the velocity of the vehicle from a quotient of the medium wheel speed NRA_M34 and the wheel speed difference NRA_D34 as follows:

$$NNDO = NRA\_D34/NRA\_M34$$

In a function F4 the corrected standardized wheel speed difference NND is determined by subtraction of the long-time filtered standardized wheel speed difference NNDF, the calculation of which is described with reference to FIG. 2, from the actual standardized wheel NNDO.

In the embodiment shown in FIG. 1, to the difference from the actual standardized wheel speed difference NNDO minus long-time filter standardized wheel speed difference NNDF, an applicable correction value NNDKOR is added in order subsequently to offer to the applicator another possible correction.

The corrected standardized wheel speed difference NND thus results according to the equation:

$$NND = NNDO - NNDF + NNDKOR$$

With the corrected, standardized wheel speed difference NND, the median wheel speed NRA_M34 and the factor AQFAKT, the transverse acceleration value AQ is finally calculated in a function F5 according to the equation $$AQ[m/s^2] = NRA\_M34 * NRA\_M34 * NND/AQFAKT$$

the factor AQFAKT being here determined exactly as described before referring to the deactivated tolerance balance of the wheels.

FIG. 2 shows a module M2 for calculating the long-time filtered standardized wheel speed difference NNDF which is determined by filtering of the standardized wheel speed difference NNDO.

The standardized wheel speed difference NNDO is filtered with a low pass of first order. A value of a standardized wheel speed difference NNDO is here equalized repeatedly according to the function $$NNDF = [B * NNDO + (65536 - B) * NNDF]/65536$$

with a filter time constant B to a filtered standardized wheel speed difference NNDF.

The filter time constant B and a time difference between the calculation process (task) determine the length in time of the filtering of the filtered standardized wheel speed difference NNDF.

As condition for filtering is tested in a first function S1 whether the standardized wheel speed difference NNDO does not exceed a maximum limiting value NNDMAX. If NNDMAX is exceeded, a branching off to a truncation function S2 is made and the filtering is omitted.

Besides the condition of the function S1, other important conditions for the filtering are added in the instant embodiment.

Thus, no brake can be actuated in order to prevent an adulteration of the result by a slip occurring at the same time. Also no switch must be active, since thereby the wheel speeds can change. Furthermore, no wheel slip must occur and no control deceleration of anti-blocking system (ABS) must be detected. On account of the strong influence on the wheel speeds, there also must be no demand for anti-slip control (ASC) after a start in the second gear and no demand for an upshift or downshift prevention by an operating dynamic control (FDR).

These conditions are constantly monitored in the function S3. When one condition is no longer met a function F4 is activated for truncating the filtering.

When the conditions of functions S1 and S3 are met, the filtered standardized wheel speed difference NNDF is calculated in a function S5 and outputted to the program module M1.

In case the conditions are not met, the old value of the filtered standardized wheel speed difference NNDF determined from the preceding calculation and stored in function S5 of module M2 is provided to module M1 and is also used.

In the initialization state, as wheel difference correction value is set the filtered standardized wheel speed difference NNDF from a non-volatile accumulator (ACC) associated with function S5 in module M2, where the value from the last travel is stored.

By the correction of the filtered standardized wheel speed difference NNDF, the calculated transverse acceleration value AQ can optionally be less than zero. When this is established in a test function F6 shown in FIG. 1, a truncated function F7 is started in which the transverse acceleration value AQ is set to zero.

In the instant embodiment the transverse acceleration value AQ thus determined serves as input variable for a program module F8, not shown in detail, for detection of a cornering, an upshift prevention being triggered in case of a cornering to ensure driving stability.

In this program module cornering is detected when the determined transverse acceleration value AQ exceeds a characteristic line AQKURVE which is established according to variables proportional to transverse acceleration values AQ and a driver's activity such as an evaluation meter. When the threshold AQKURVE is fallen below the situation "cornering" is considered as not detected.

To avoid shuttling between "curve detected" and "curve not detected", the characteristic line AQKURVE is subject to hysteresis, so that the change from "curve detected" to "curve not detected" is determined only when the transverse acceleration value (AQ) falls below a lower characteristic line hysteresis value AQKURVE" that is lower than AQKURVE. The change from "curve not detected" to "curve detected" may also be delayed until the transverse acceleration value (AQ) exceeds an upper characteristic line hysteresis value AQKURVE' that is higher than AQKURVE.

When the transverse acceleration has lowered at the end of a curve below the characteristic line AQKURVE, in the program module for detection of cornering a safety distance WEG is preset with a distance WEGKV dependent on output rotational speed. From the output rotational speed, in each program cycle lasting, for ex., 30 ms for which cycle the vehicle velocity is approximated as constant, an already covered distance INC is determined which is removed from the safety distance. Only when the safety distance has been covered is the curve considered as no longer detected.

Within the distance of the transverse acceleration value AQ, if the threshold AQKURVE is again exceeded, then a cornering is again detected and the safety distance is again preset with the distance WEGKV dependent on the output rotational speed.

In addition to this very advantageous application of the transverse acceleration value AQ determined in the above described manner, this precise value obviously can also be used in numerous other program modules of the electronic transmission control.

| References | |
|---|---|
| ABS | anti-blocking system |
| AQ | transverse acceleration value |
| AQFAKT | factor for calculation of the transverse acceleration |
| AQKURVE | characteristic line, driver-type dependent threshold for curve recognition |
| ASC | anti-slip control |
| B | filter constant of the wheel speed difference |
| F1 | differentiation function |
| F2 | processing function, AQ calculation without wheel speed balance |
| F3 | processing function, NNDO calculation |
| F4 | processing function, NND calculation |
| F5 | processing function, AQ calculation with wheel speed balance |
| F6 | differentiation function |
| F7 | processing function |
| FDR | drive dynamic control |
| INC | covered distance, increment to safety distance |
| M1 | program module, module of tolerance balance of wheels |
| M2 | program module for calculation of NNDF |
| NND | corrected standardized wheel speed difference |
| NNDF | long-time filtered standardized wheel speed difference |
| NNDKOR | applicable correction value |
| NNDMAX | maximum admissible wheel speed difference |
| NNDO | standardized wheel speed difference |
| NRA_D34 | wheel speed difference |
| NRA_M34 | median speed difference |
| NRA3 | wheel speed of the left, non-driven vehicle wheel |
| NRA4 | wheel speed of the right, non-driven vehicle wheel |
| NRAMAX | maximum wheel speed for wheel speed balance |
| NRAMIN | minimum wheel speed for wheel speed balance |
| RDYN | dynamic tire radius |

What is claimed is:

1. A method for determining a transverse acceleration value (AQ) for control of an automatic transmission of a motor vehicle when a dynamic tire radius of a vehicle wheel diverges from an optimum tire geometry radius, comprising the steps of:

determining an actual standardized wheel speed difference (NNDO) of two wheels of the vehicle, determining a corrected standardized wheel speed difference (NND) of the two wheels by correcting the actual standardized wheel speed difference (NNDO) by a previously determined time filtered standardized wheel speed difference (NNDF), and determining a transverse acceleration value (AQ) from the corrected standardized wheel speed difference and a factor for calculation of the transverse acceleration value (AQ) in a curve, the factor including a dynamic tire radii of the wheels.

2. The method according to claim 1, comprising forming the standardized wheel speed difference (NNDO) from a quotient of a wheel speed difference (NRA_D34) determined as a difference between rotational speeds (NRA3, NRA4) of two oppositely located and parallel wheels of the vehicle divided by a median wheel speed (NRA_M34) determined as an average of the rotational speeds of the two wheels.

3. The method according to claim 1, comprising determining the long-time filtered standardized wheel speed difference (NNDF) by means of a filtering (S5) of the standardized wheel speed difference (NNDO).

4. The method according to claim 3, comprising carrying out the filtering (S5) of the standardized wheel speed difference (NNDO) with a low pass of first order.

5. The method according to claim 4, comprising carrying out the filtering (S5) of the standardized wheel speed difference (NNDO) according to the function $$NNDF=[B*NNDO+(65535-B)*NNDF]/65536$$

with "NNDF" as filtered standardized wheel speed difference, "NNDO" as standardized wheel difference and "B" as filter time constant of the wheel speed difference.

6. The method according to claim 3, comprising omitting the filtering (S5) when the filtered standardized wheel speed difference (NNDF) is greater than a predefined limiting value (NNDMAX).

7. The method according to claim 3, comprising omitting the filtering (S5) when detecting a brake actuation or a shift, or a wheel slip, or a control brake of an anti-blocking system (ABS), or a demand of an anti-slip control (ASC), or a driving dynamic control.

8. The method according to claim 1, comprising determining the corrected standardized wheel speed difference (NND) from the difference between the standardized wheel speed difference (NNDO) minus the long-time filtered standardized wheel speed difference (NNDF).

9. The method according to claim 1, comprising determining the corrected standardized wheel speed difference (NND) from the difference between the standardized wheel speed difference (NNDO) minus the long-time filtered standardized wheel speed difference (NNDF) plus an applicable correction value (NNDKOR).

10. The method according to claim 1, comprising providing the corrected standardized wheel speed difference (NND) for calculation of the transverse acceleration value (AQ) using the following function:

$$AQ = NRA\_M34 * NRA\_M34 * NND / AQFAKT$$

with "AQ" as transverse acceleration value, "NRA_M34" as median wheel speed, "NND" as standardized wheel speed difference and "AQFAKT" as factor for calculation of the transverse acceleration.

11. The method according to claim 10, wherein the factor for calculation of the transverse acceleration (AQFAKT) is determined according to the function $$AQFAKT = SB * 3600 / (4 * Pi^2 * RDYN^2)$$

with "AQFAKT" as factor for calculation of the transverse acceleration, "SB" as track width and "RDYN" as dynamic tire radius.

12. The method according to claim 11, wherein the transverse acceleration value (AQ) is set to zero when the median wheel speed (NRA_M34) is outside a range defined by a minimum limiting value (NRAMIN) and a maximum limiting value (NRAMAX), the standardized wheel speed difference (NNDO) is greater than a predefined maximum value (NNDMAX), or the calculated transverse acceleration value (AQ) is less than zero.

13. The method according to claim 1, wherein a starting condition is tested whether an application switch for wheel speed tolerance balance is activated (SWI=1).

14. The method according to claim 1, wherein the transverse acceleration value (AQ), when an application switch for wheel speed tolerance balance is not activated, is calculated for wheel speed tolerance balance (SWI=0) according to the function $$AQ = (NRA\_M34 * NRA\_D34) / AQFAKT$$

with "AQ" as transverse acceleration value, "NRA_M34" as median wheel speed and "AQFAKT" as factor for calculation of the transverse acceleration.

15. The method according to claim 1, wherein the dynamic tire radius (RDYN) for a slip-free rolling wheel is determined during travel.

16. The method according to claim 1, wherein as wheel speeds (NRA3, NRA4) are used the wheel speeds of non-driven vehicle wheels.

17. The method according to claim 1, wherein the transverse acceleration value (AQ) determined with the tolerance balance module (M1) of wheels is used as input variable in a program module for detecting a cornering wherein a cornering is detected when the transverse acceleration value (AQ) determined exceeds a characteristic line (AQKURVE) which is established according to transverse acceleration values (AQ) and variables proportional to a driver's activity.

18. The method according to claim 17, wherein the characteristic line (AQKURVE) is subject to hysteresis.

19. The method according to claim 17, wherein
after initially detecting a transverse acceleration value (AQ) indicating that the vehicle is cornering, and
after subsequently detecting that the transverse acceleration value (AQ) has fallen below a value indicating that the vehicle is traversing a corner,
determining a safety distance (WEG) as a rotational speed dependent distance value (WEGKV) and
determining that the vehicle is no longer cornering when the vehicle has exceeded the safety distance (WEG) and the transverse acceleration value (AQ) has remained below a value indicating that the vehicle is traversing a corner.

20. The method according to claim 17, wherein upon detection of a cornering an upshift prevention is triggered.

* * * * *